United States Patent [19]

Ashinuma et al.

[11] Patent Number: 4,918,677
[45] Date of Patent: Apr. 17, 1990

[54] INFORMATION RECORDING/REPRODUCING APPARATUS INCLUDING A PLURALITY OF RECORDING OR REPRODUCING RATES

[75] Inventors: Takaaki Ashinuma, Yokohama; Takehiko Shibata, Kokubunji, both of Japan

[73] Assignee: Canon Kabushiki Kaisha, Tokyo, Japan

[21] Appl. No.: 820,230

[22] Filed: Jan. 21, 1986

[30] Foreign Application Priority Data

Jan. 23, 1985 [JP] Japan ................................. 60-10504
Jan. 30, 1985 [JP] Japan ................................. 60-16000
Feb. 8, 1985 [JP] Japan ................................. 60-23327

[51] Int. Cl.$^4$ ................ G11B 21/08; G11B 20/12; G11B 7/013
[52] U.S. Cl. ................................. 369/32; 369/59; 360/40; 360/51; 360/78.14
[58] Field of Search ................ 369/32, 50, 59, 111, 369/275; 360/51, 73, 135, 77, 78, 48, 49, 40, 73.03, 77.08, 77.02, 77.05, 77.07, 78.04, 78.14; 358/338, 342

[56] References Cited

U.S. PATENT DOCUMENTS

| | | | |
|---|---|---|---|
| 2,901,737 | 8/1959 | Stovall | 360/51 |
| 4,183,066 | 1/1980 | Anderson | 360/40 |
| 4,231,071 | 10/1980 | Anderson | 360/51 |
| 4,314,287 | 2/1982 | Freeman et al. | 360/51 |
| 4,357,635 | 11/1982 | Hasegawa | 360/51 |
| 4,432,025 | 2/1984 | Grogan | 360/48 |
| 4,514,771 | 4/1985 | Stark et al. | 360/73 |
| 4,530,018 | 7/1985 | Hoshino et al. | 360/73 |
| 4,532,621 | 7/1985 | Nakagawa | 369/111 |
| 4,546,461 | 10/1985 | Isobe | 369/50 |
| 4,550,347 | 10/1985 | Nakamuta | 358/338 |
| 4,558,375 | 12/1985 | Sontheimer | 358/342 |
| 4,641,294 | 2/1987 | Yoshimaru | 369/32 |
| 4,714,967 | 12/1987 | Bizjak | 360/48 |
| 4,751,693 | 6/1988 | Yoshimaru | 369/32 |

FOREIGN PATENT DOCUMENTS

| | | | |
|---|---|---|---|
| 0018157 | 10/1980 | European Pat. Off. | |
| 0080256 | 6/1983 | European Pat. Off. | |
| 3424105 | 1/1985 | Fed. Rep. of Germany | |
| 2508217 | 12/1982 | France | |
| 55-125516 | 9/1980 | Japan | 360/51 |
| 57-120205 | 7/1982 | Japan | |

Primary Examiner—Vincent P. Canney
Assistant Examiner—Steven R. Garland
Attorney, Agent, or Firm—Fitzpatrick, Cella, Harper & Scinto

[57] ABSTRACT

An apparatus for recording or reproducing information on or from a recording medium such as a disk which rotates at a constant angular velocity. This apparatus comprises: a system to record or reproduce the data on or from the disk; a circuit to designate the recording or reproduction address of the data on the disk; and a control circuit to control the data recording or reproducing rate for the disk. The control circuit makes the recording or reproducing rate constant for a predetermined data and changes the recording or reproducing rate for the other data in accordance with the recording or reproduction address. In this apparatus, by providing track groups in the header portions and data recording portions in the direction of radius of the disk, the clock rate can be easily changed and the recording density is increased and the access time is reduced.

25 Claims, 9 Drawing Sheets

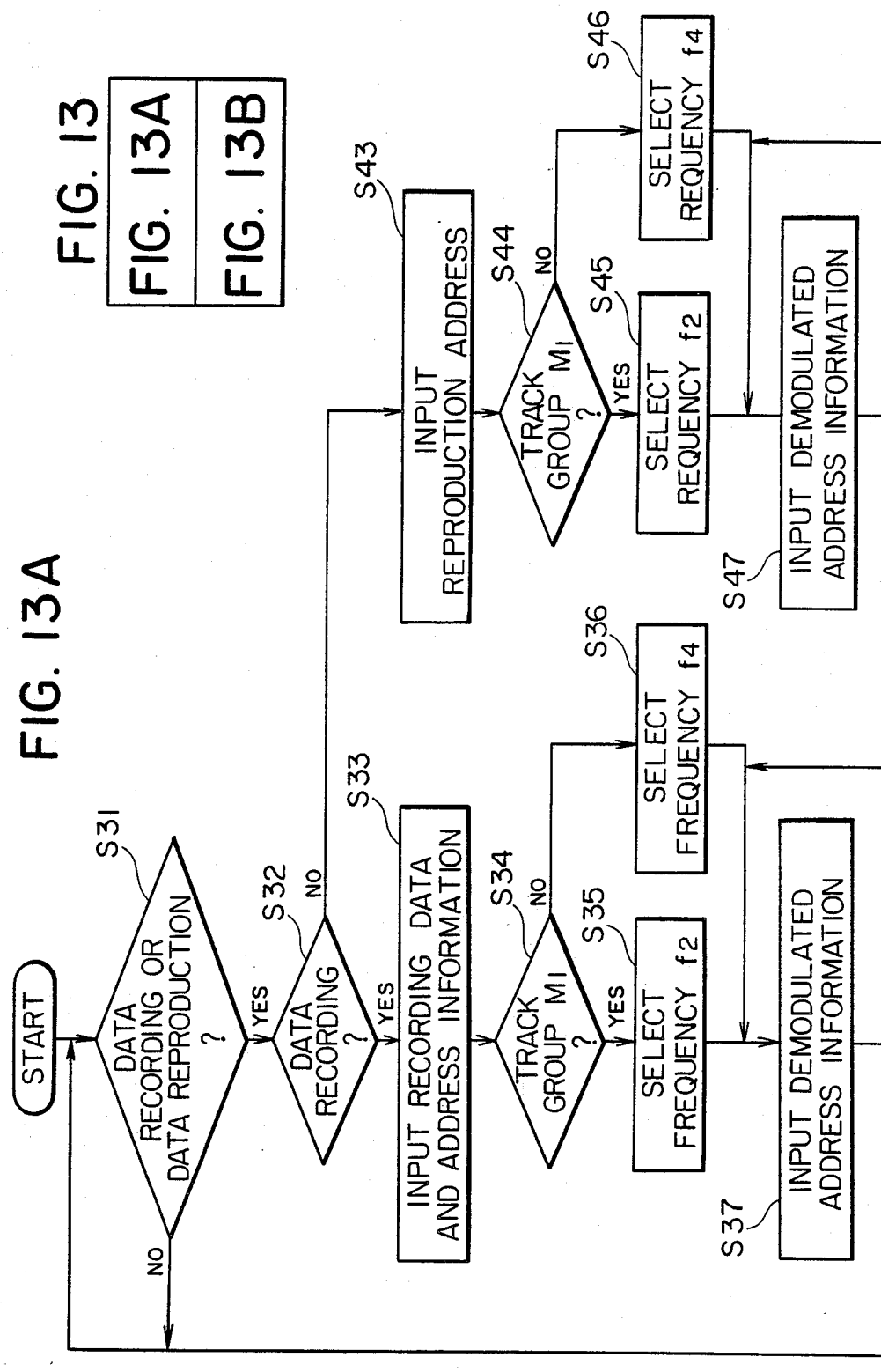

INFORMATION RECORDING/REPRODUCING APPARATUS INCLUDING A PLURALITY OF RECORDING OR REPRODUCING RATES

BACKGROUND OF THE INVENTION

1. Field of the Invention

The present invention relates to an information recording/reproducing apparatus and, more particularly, to an information recording/reproducing apparatus for recording on and reproducing from a discoidal recording medium.

2. Description of the Prior Art

Hitherto, as such a kind of apparatuses, there are magnetic disk, optical disk, photo-magnetic disk, etc. An explanation will be made as an example with respect to the optical disk.

In the case of recording information on the optical disk which is rotating at a constant angular velocity, the minimum pit diameter is limited due to limitation of the diameter of a laser beam which is used for recording and reproduction. The recording and reproducing conditions are the severest at the innermost rim where the linear velocity is the slowest. The transfer rate of the recording data is determined by the pit diameter and the rotating speed of the disk at the innermost rim. In this case, the recording density deteriorates as the recording position approaches the outer periphery. As a system of preventing this problem, there is known what is called a CLV (Constant Linear Velocity) system in which the linear velocity is optimized in consideration of the pit diameter and the discoidal recording medium is rotated such that the linear velocity becomes constant, thereby making constant the recording density on the disk surface and the recording disk is most efficiently used with respect to the recording density. However, this CLV system has the following drawback. Namely, in the case where the disk is accessed at the positions of largely different diameters such as from the inner rim to the outer rim, or the like, it takes a time until the rotating speed of the discoidal recording medium becomes the constant linear velocity because of the inertia or the like of the medium, so that the access time becomes longer than that of what is called a CAV (constant Angular Velocity) system in which the angular velocity is constant, or the like.

SUMMARY OF THE INVENTION

It is an object of the present invention to eliminate the above-mentioned drawbacks.

Another object of the invention is to improve the information recording/reproducing apparatus.

Still another object of the invention is to provide an information recording/reproducing apparatus having a high recording density.

Still another object of the invention is to provide an information recording/reproducing apparatus having a short access time.

The above and other objects and features of the present invention will become apparent from the following detailed description and the appended claims with reference to the accompanying drawings.

BRIEF DESCRIPTION OF THE DRAWINGS

FIGS. 13A and 13B illustrate a flowchart showing the control operation of the controller.

DETAILED DESCRIPTION OF THE PREFERRED EMBODIMENTS

An embodiment of the present invention will be described hereinbelow with reference to the drawings. An explanation will be made as an example with respect to the optical disk in this embodiment.

Figure 1:
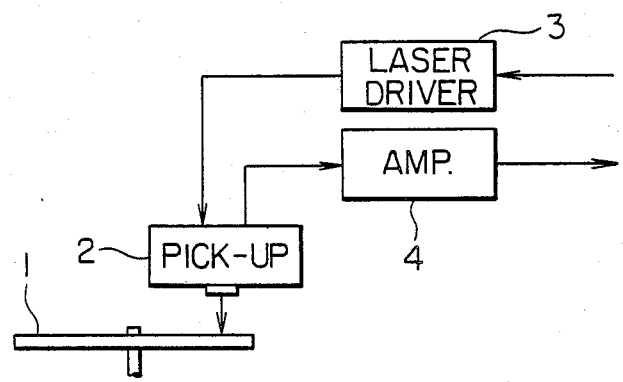
FIG. 1 is a block diagram showing an example of an arrangement of a head of the recording/reproducing system in the present invention.

In FIG. 1, reference numeral 1 denotes a discoidal recording medium on which an information signal is recorded. This recording medium rotates at a constant angular velocity. An optical pick-up 2 serves to write and read out the information signal on and from the medium 1. The signal is written and read out by this pick-up by a well-known technology. A laser driver 3 serves to brilliance modulate a semiconductor laser (not shown) in the optical pick-up 2. A pre-amplifier 4 amplifies the information signal read out by the pick-up 2.

Figure 2:
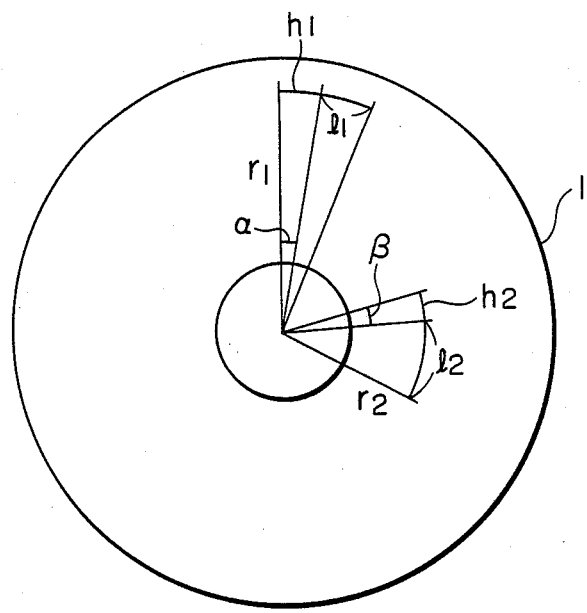
FIG. 2 is a diagram showing an example of a format of a disk in the invention.

FIG. 2 shows a recording format on the disk in the embodiment.

A number of spiral tracks are recorded on the disk. Header portions $h_1$ and $h_2$, the preformat portions in which the address signal, track number, sector number, information indicating whether or not the sector is the defective sector, information representing whether or not the sector is the exchange sector of a defective sector, and the like are preformated and recorded at a fixed clock rate. Angles $\alpha$ and $\beta$ corresponding to the header portions in FIG. 2 are always constant even when the radius on the disk changes for each sector. This clock rate is obtained on the basis of the minimum pit length at the innermost portion due to limitations of the size of beam diameter and the like due to the rotating speed of the disk, numerical aperture (NA) of the lens, and the like.

On the other hand, the circumferential lengths of data areas $l_1$ and $l_2$ are inversely proportional to radii $r_1$ and $r_2$ on the disk such that the clock rate is proportional to the radius from the center of the disk to the recording position.

Thus, the number of sectors on the same track increases as the recording position approaches the outer peripheral portion: however, the capacity of each sector can be made constant and the disks can be easily managed.

Figure 3:
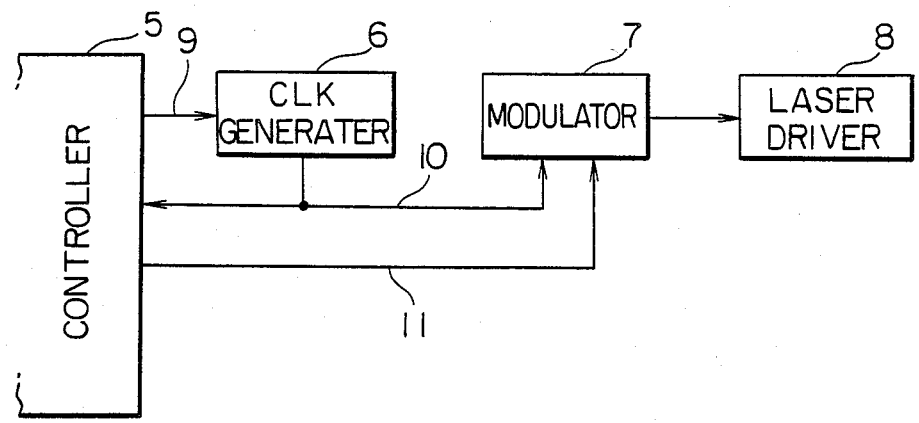
FIG. 3 is a block diagram showing an example of an arrangement of the recording system in the invention.

FIG. 3 shows a block diagram of the recording section of the embodiment. A controller 5 controls the whole sequence and the transmission and reception of data. In response to an address signal 9 from the controller 5, a clock generator 6 generates a clock of the frequency corresponding to the address of the address signal 9. A modulator 7 modulates write data 11 on the disk from the controller 5 in order to actually write this data synchronously with a clock 10 from the clock generator 6. A laser driver 8 drives the semiconductor laser in response to a signal from the modulator 7 and corresponds to the laser driver 3 in FIG. 1.

Figure 4:
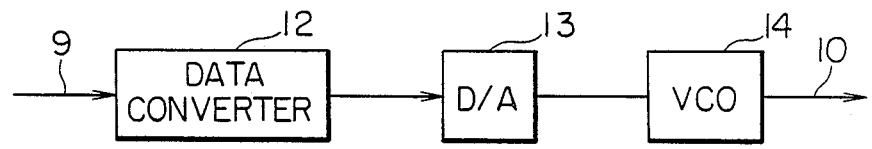
FIG. 4 is a block diagram showing an example of an arrangement of a clock generator of the recording system of FIG. 3.

FIG. 4 shows a block diagram showing an arrangement of the clock generator 6. The clock generator 6 comprises: a converter 12 to convert the address signal 9 from the controller 5 into the data proportional to the radius at the recording position; and a D/A converter 13 to convert a digital signal from the converter 12 into an analog signal in order to drive a VCO (Voltage Controlled Oscillator) 14 at the next stage to generate a clock.

The recording operation will now be described. In this case of recording information in a certain sector, the address signal 9 of the sector where the recording is performed is sent from the controller 5 to the clock generator 6. The address signal 9 is inputted to the data converter 12 and D/A converted by the D/A converter 13 at the next stage into the signal of the voltage proportional to the radius at the recording position on the disk. The D/A converted signal is supplied to the VCO 14. The recording data 11 is outputted from the controller 5 synchronously with the clock which is generated from the VCO 14. By modulating the recording data 11 using the clock from the VCO as a reference clock, the data can be recorded in the data area at the clock rate proportional to the radius at the recording position. Alternately, the original clock may be frequency divided in response to the address signal to obtain the clock of the clock rate proportional to the radius.

Figure 5:
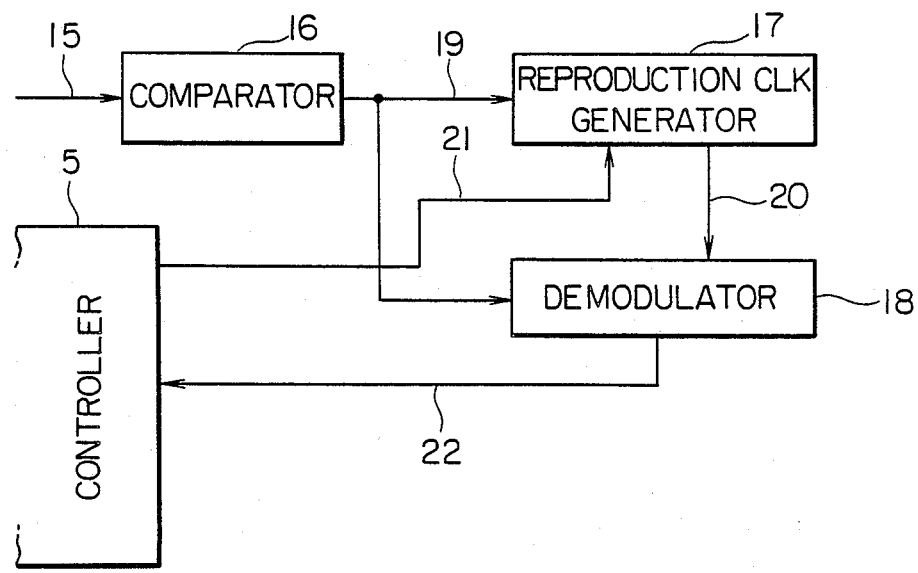
FIG. 5 is a block diagram showing an example of an arrangement of the reproducing system in the invention.

FIG. 5 shows a block diagram of the reproducing section of the embodiment. Reference numeral 15 denotes an output signal from the reproduction preamplifier 4; 16 is a comparator to binarize the reproduced output signal 15; 17 a reproduction clock generator to produce a reference clock 20 to demodulate a binarized signal 19; and 18 a demodulator to obtain the original information from the clock 20 and reproduced binarized signal 19.

The operation will now be described. Although the reproduction clock generator 17 is constituted by a well-known PLL circuit, in the case of the embodiment, when the ratio of the radius of the innermost rim of the disk to the radius of the outermost rim is 1:2, there is the difference of at least two times between the clock rates of the signals which are used as the reference clocks in the innermost and outermost rims. However, recording to the ordinary PLL circuit, the range of frequency which can be locked lies within the range of about ±5% of the center frequency, so that it is difficult to stably lock the frequency to a desired frequency within this limited range. Therefore, in this embodiment, when the reproduction address is designated, a PLL control signal 21 is sent from the controller 5 to the clock generator 17, i.e., the PLL circuit and the center frequency of the lock range of the pll circuit is changed, thereby to control the control range of the PLL circuit such that the clock rate is set to the value of the corresponding address. In this manner, the binarized signal is demodulated by the demodulator 18 by the clock proportional to the radius at the recording position and a demodulated signal 22 is outputted from the demodulator 18 to the controller 5.

Figure 6:
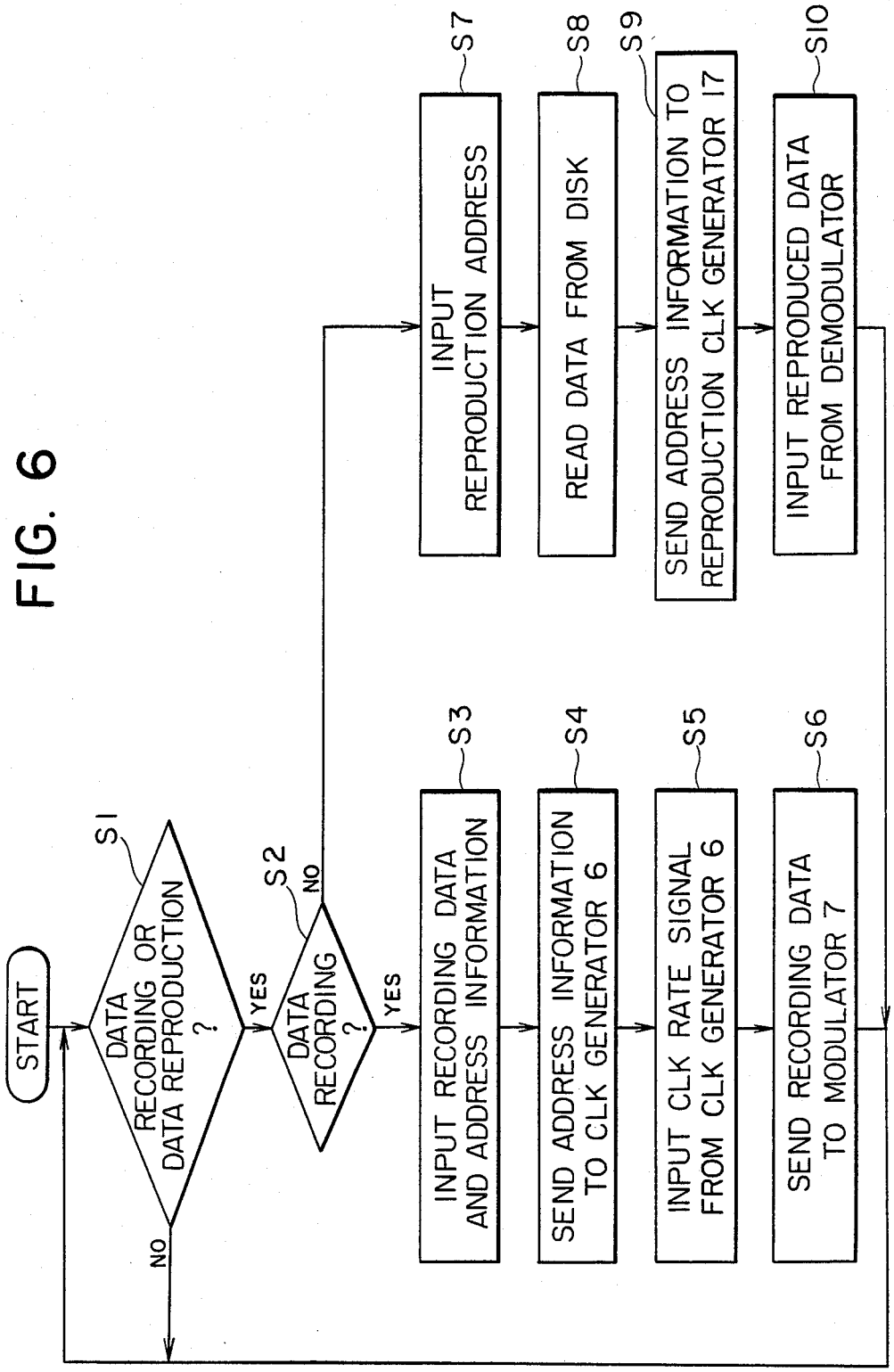
FIG. 6 is a flowchart showing an example of the control operation of a controller in the invention.

FIG. 6 is a flowchart for the control operation of the controller 5 according to the embodiment.

First, a check is made to see if the data recording or reproducing mode has been instructed from an external apparatus (not shown) (step S1).

In the case of the data recording mode, the recording data and address information indicative of the recording position on the disk of this recording data are inputted from the external apparatus (not shown) (steps S2 and S3).

The address information 9 is transmitted to the clock generator 6 and the signal of the clock rate corresponding to the radius of the recording address is inputted from the clock generator 6 (steps S4 and S5).

The recording data is transmitted to the modulator 7 on the basis of the signal inputted from the clock generator 6 and a motor and the like of the disk apparatus are controlled and the recording is executed (step S6).

On the contrary, in the case of the data reproducing mode, the reproduction address of the recording data is inputted from the external apparatus (step S7). The motor and the like of the disk apparatus are controlled in accordance with the reproduction address and the data is read out from the disk (step S8). The address signal is transmitted to the reproduction clock generator 17 (step S9) to generates the signal of the clock rate proportional to the radius of the reproduction address. The recording data is reproduced using this signal as a reference clock and the reproduced data is inputted (step S10).

By changing the recording or reproducing rate in accordance with the position of the discoidal recording medium as described above and making the recording or reproducing rate constant for a predetermined data, it is possible to access at a high speed without being influenced by the inertia of the disk as in the case of the CLV system and it is possible to constitute the information recording apparatus having a capacity larger than that of the CAV system.

Figure 7:
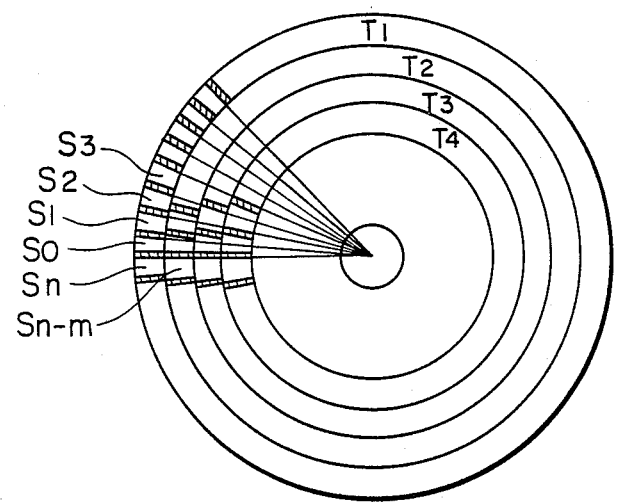
FIG. 7 is a diagram showing an example of formats on the disk in the invention.

Although the clock rate of the data recording section is made proportional to the radius at the data recording position in the embodiment, it is difficult to change the frequency for every track; therefore, a format shown in FIG. 7 is considered.

FIG. 7 shows an example of track and sector formats on the disk. $T_1$ to $T_4$ indicate groups of tracks, respectively. In each track group, data recording portions $S_1$ to $S_n$ in each sector are recorded at the same recording frequency, so that in the case of the reproduction, the sampling is performed by the reproduction clock which is equal to this recording frequency and the recording data is reproduced.

For example, the data sections are recorded at a frequency $f_1$ in the $T_1$ track group in the outer peripheral portion of the disk. The data sections are similarly recorded at a frequency $f_2$ in the inner track group $T_2$. The data sections are recorded at a frequency $f_3$ in the $T_3$ track group. The data sections are recorded at a frequency $f_4$ in the innermost track group $T_4$. There is the relation of $f_1 > f_2 > f_3 > f_4$ among those frequencies. Due to this, the recording density on the disk can be substantially optimized. The address signal, sector number, and the like are preformatted and recorded at the same frequency of, e.g., $f_0$ on the whole disk surface in the header portions at the heads of the respective sectors indicated by the hatched portions on the disk of FIG. 7. This recording disk rotates at the CAV mentioned before. A frequency $f_0$ is determined by the pit diameter of the header portion in the innermost track group $T_4$ due to the limitation of the diameter of the recording/reproducing light beam, so that there is the relation of almost $f_0 \approx f_4$ (data recording frequency of the $T_4$ track group). As shown in FIG. 1, the outermost track group $T_1$ is constituted by the sectors $S_0, S_1, \ldots, S_n$ and is formated such that $(n+1)$ sectors are formed for every track. The $T_2$ track group consists of the sectors of $S_0, S_1, \ldots, S_{n-m}$ and is formated such that $(n-m+1)$ sectors are formed for every track, in which n and m are positive integers. The $T_3$ and $T_4$ track groups are similarly constituted and the number of sectors of the innermost track group $T_4$ is about $\frac{1}{2}$ of the number $(n+1)$ of sectors of the outermost track group $T_1$. Due to this, when the recording range of the disk lies within the range of $\frac{1}{2}$ to 2/2 of the radius, the recording/reproducing performance of this disk is optimized.

For example, when considering the disk of a diameter of 200 mm, its radius is 100 mm, so that the outermost recording track may be set at a position of a radius of about 94 mm and the innermost recording track may be set at a position of a radius of about 54 mm. In this case, the track groups are divided in a manner such that: 94−84 mm for $T_1$; 84−74 mm for $T_2$; 74−64 mm for $T_3$; and 64−54 mm for $T_4$. Since the pits which are formed in the innermost track in each track group are severest in terms of the spatial frequency, the format is decided in accordance with the innermost track. For example, when data is recorded assuming that the minimum recording pit length is 1.27 $\mu$m in the direction of track, one sector consists of 1010 bytes, and the recording modulation system is the MFM system, the track lenght becomes as follows with respect to the innermost track of the $T_4$ track group.

$$\text{Track length} = 2\pi \times 54 \text{ mm} = 339292 \ \mu\text{m} \quad (1)$$

The length necessary to record the data of one byte becomes $$1.27 \ \mu\text{m} \times 8 = 10.16 \ \mu\text{m} \quad (2)$$

Therefore, the length of sector becomes $$10.16 \ \mu\text{m} \times 1010 = 10.26 \text{ mm} \quad (3)$$

Thus, by dividing (1) by (3), the number of sectors per one track becomes $$339292 \ \mu\text{m} / 10.26 \text{ mm} = 33 \text{ sectors/track}$$

Therefore, 33 sectors are formed for every track in the $T_4$ track group.

In a manner similar to the above, in the $T_3$ track group, we have $$2\pi \times 64 \text{ mm} / 10.26 \text{ mm} = 39 \text{ sectors/track}$$

However, the ratio of the area which is occupied by the header portion of one sector increases as the recording position approaches the outer periphery, so that the area which is occupied by the useful sector decreases by an amount as much as the increased amount of the header portion. The area corresponding to about one sector is reduced as the result of correction of the foregoing decreased amount of sectors, so that 38 sectors are actually formed for every track. Therefore, the $T_3$ track group is constituted at the ratio of 38 sectors/track.

Similarly, we have $$2\pi \times 74 \text{ mm} / 10.26 \text{ mm} = 45 \text{ sectors/track}$$

in the $T_2$ track group and the ratio of 43 sectors/track is obtained as a corrected value.

Likewise, in the $T_1$ track group, we have $$2\pi \times 84 \text{ mm} / 10.26 \text{ mm} = 51 \text{ sectors/track}$$

and the ratio of 48 sectors/track is derived as a corrected value.

Assuming that the pitch between tracks is 1.6 $\mu$m, 10 mm/1.6 $\mu$ = 6250 tracks are constituted in the area of each track group of 10 mm, so that the number of whole sectors is given by the following expression from the number of sectors which are formed in the track groups $T_1$ to $T_4$.

$$(33+38+43+48) \times 6250 = 1,012,500, \text{ sectors/surface}$$

When it is assumed that the number of user's bytes in one sector which can be freely used by the user is 512 bytes (hereinafter, "bytes" is simply abbreviated as B), the number of user's bytes per one surface of the disk becomes about 518 MB (MB = $10^6$ B).

In the above calculations, the fraction which is produced in the steps of calculting the number of sectors of one track is removed to obtain the sectors of integer. It is sufficient to allocate the remainder to the gap between sectors or the like. Among 1010 B/sector, the number of bytes which can be used by the user for recording was set to 512 B. A part of the remining bytes are used for the header portions and the others are used for a strong error correction; however, their detailed descriptions are omitted.

On the other hand, if data is recorded on the whole surface at the freequency $f_4$ on the basis of the format of the $T_4$ track group, in other words, if the recording is performed on the whole surface by way of the CAV recording system, the memory capacity of the whole surface becomes $$(33 + \times + 33 + 33) \times 6250 = 825,000 \text{ sectors}$$

Thus, the number of user's bytes per one surface becomes $$512 \text{ B} \times 825,000 = 422 \text{ MB/surface}.$$

Therefore, according to the recording system of the embodiment, the recording capacity can be increased by 518/422 = 1.23 times, namely, 23% as compared with the CAV system.

Figure 8:
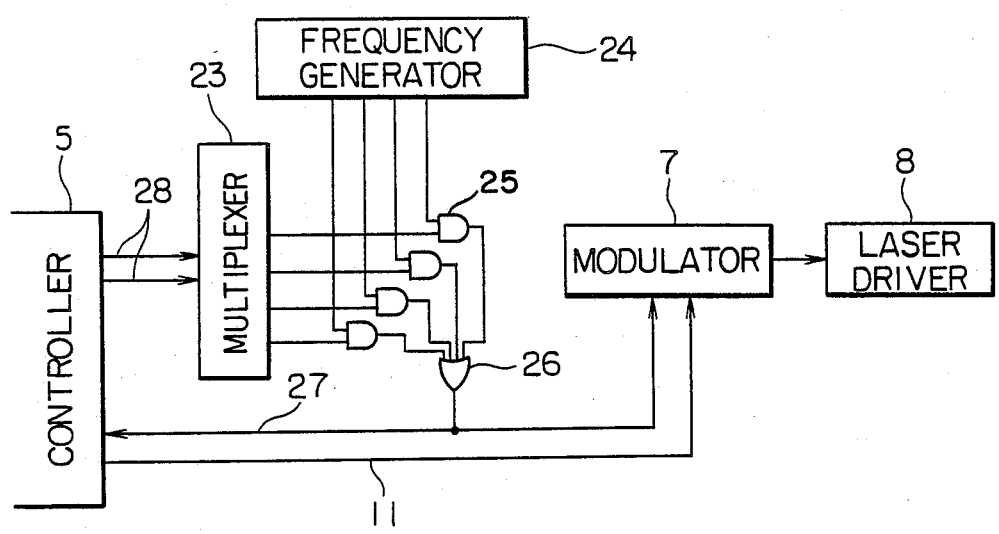
FIG. 8 is a block diagram showing an arrangement of the recording system.

The recording sequence of the disk of FIG. 7 will then be described hereinbelow with reference to FIG. 8. In FIG. 8, a multiplexer 23 is provided. In the recording mode, an encoding signal 28 of two bits is first generated from the controller 5 and inputted to the multiplexer 23 on the basis of the address number instructed from the external apparatus (not shown), namely, in dependence on to which one of the areas $T_1$, $T_2$, $T_3$, and $T_4$ of the disk the address belongs. The multiplexer 23 selects one of AND gates 25 in accordance with the two-bit signals 00, 01, 10, and 11. A frequency generator 24 generates signals of frequencies $f_1$, $f_2$, $f_3$, and $f_4$. The frequency generator 24 includes therein four oscillators using, for example, well-known quartz resonators. One of the frequencies $f_1$ to $f_4$ is selected by the AND gate 25 selected. Outputs of the AND gates 25 are inputted to an OR gate 26 and an output of the OR gate 26 becomes a reference clock 27 in the recording mode. This reference clock is sent to the controller 5 and is used to read out the recording data 11 and at the same time it is inputted to the modulator 7. Both of the recording data 11 from the controller 5 and the reference clock 27 upon recording are inputted to the modulator 7, by which they are mixed and modulated. The modulated signal is outputted to the laser driver 8, so that the data is recorded by the modulated optical beam.

Figure 9:
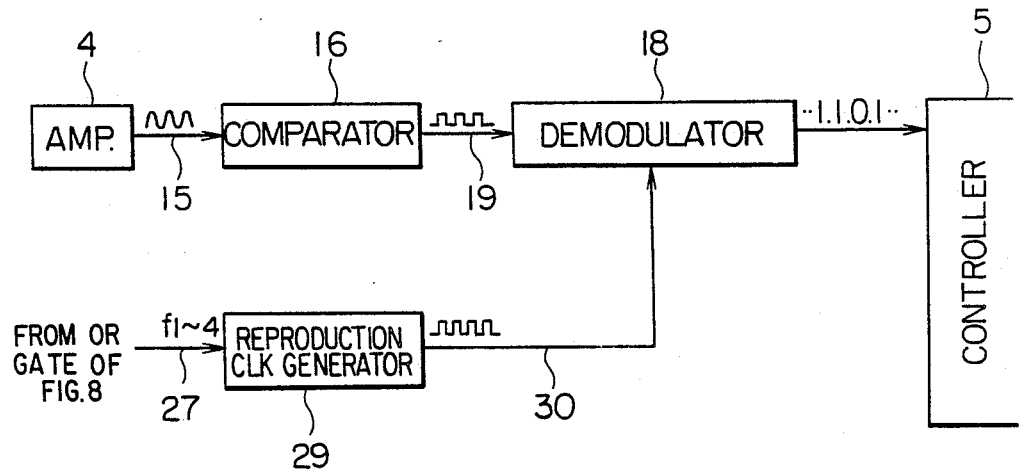
FIG. 9 is a block diagram showing an arrangement of the reproducing system.

FIG. 9 is a block circuit diagram of the reproducing system of the embodiment. The reproduced analog output signal 15 of the reproduction preamplifier 4 is binarized by the comparator 16. A reproduction clock generator 29 generates a reference clock to demodulate the original data from the binarized signal 19. The demodulator 18 produces the bit string of the recording data by sampling the binarized output signal 19 by a reproduction clock signal 30 which is outputted from the reproduction clock generator 29.

The operation will then be described hereinbelow. The generator 29 is constituted by what is called a PLL circuit. However, as in the case of the embodiment, there is the difference of about two times between recording/reproducing clock rates of the innermost track group $T_4$ and outermost track group $T_1$ and it is difficult to stably lock the frequency to a desired frequency within this limited range by the ordinary PLL circuit. Therefore, in this embodiment, when the address is designated in the reproducing mode, a frequency selection signal corresponding to the address is generated from the controller 5 similarly to the case in the recording mode. Either one of the frequencies $f_1$ to $f_4$ is outputted through the AND gate 25 and OR gate 26 to the reproduction clock generator 29 as a comparison frequency of the generator 29, thereby properly changing the center frequency of the PLL circuit. The binarized output signal which is outputted from the comparator 16 by the reproduction clock obtained in this way is sampled by the demodulator 18, so that the recording data bit string (..., 1, 1, 0, 1, ...) is obtained.

The data recording section of the sector has been described above. The preformatted header portions will then be further described. In the preformatted header portions, the recording is performed at substantially the same clock rate as the frequency $f_4$ of the $T_4$ track group. Therefore, in the reproducing mode, to read the address in the header portion, the frequency $f_4$ is first selected and inputted as the comparison frequency by the controller 5 for the PLL circuit of the generator 29. A PLL sync signal of the header portion and a reproduction clock signal of the address portion whose phase was locked at a high speed are obtained. The data bit string of the address portion is outputted from the demodulator 18 on the basis of the reproduction clock signal and the binarized signal 19 from the comparator 16. The address is checked by the controller 5. Thereafter, one of the data recording frequencies $f_1$ to $f_4$ is selected in correspondence to the address by the controller 5 in a manner similar to the above. Finally, the recording data bit string is outputted from the demodulator 18. The recording data is separated from the clock by the controller 5 and the error correcting code (ECC) is added to the recording data and thereafter the original data is accurately demodulated.

Figure 10:
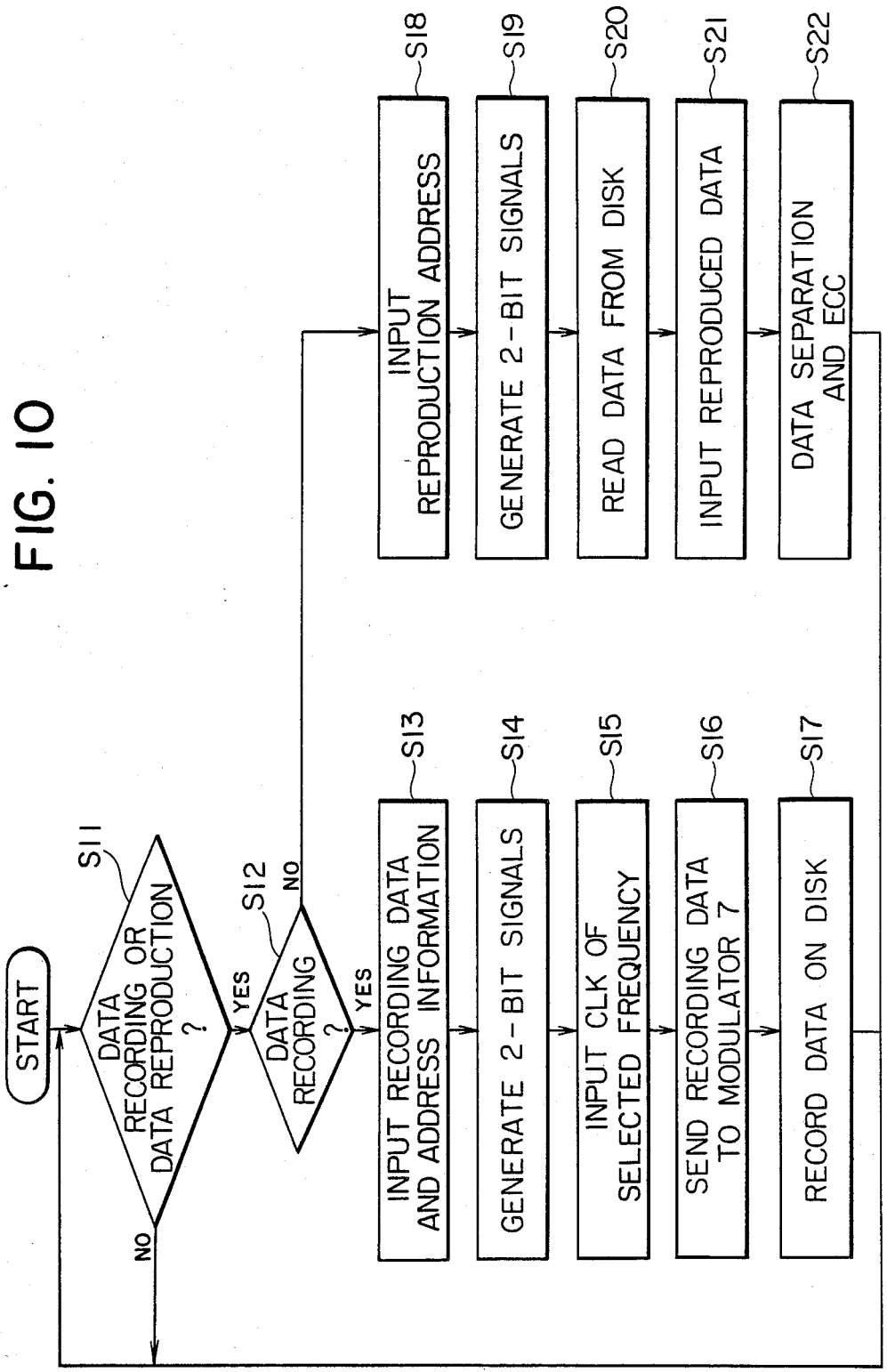
FIG. 10 is a flowchart showing the control operation of the controller.

FIG. 10 shows a control flow of the controller in the embodiment. First, a check is made to see if the data recording or reproducing mode has been instructed from an external apparatus (not shown) (step S11). In the data recording mode, the recording address and recording data are inputted from the external apparatus (steps S12 and S13). It is determined to which one of the track groups $T_1$ to $T_4$ the data belongs in accordance with the address information inputted and the 2-bit signal to select the recording frequency is transmitted to the multiplexer 23 (step S14). The clock of the selected frequency is inputted (step S15). The recording data is transmitted to the modulator 7 synchronously with this clock (step S16). The motor and the like are controlled and the data is recorded on the disk on the basis of the modulated data (step S17). To reproduce the data, the reproduction address is inputted from the external apparatus (step S18). The 2-bit signal to select the recording frequency is transmitted to the multiplexer 23 in a manner similar to the case in the recording mode (step S19). The motor and the like are controlled and the data is read out from the disk (step S20). The reproduced data demodulated by the clock of the selected frequency is inputted (step S21). The reproduction clock and the reproduced data are separated and the error correcting code (ECC) is added to the reproduced data and the original data is reproduced (step S22).

Although the recording track groups were divided into four groups $T_1$ to $t_4$ in the embodiment, it may be divided into a slightly large number of, e.g., eight groups $T_1$ to $T_8$. Therefore, the recording frequency may be likewise finely set to eight frequencies $f_1$ to $f_8$. Due to this, the whole recording capacity increases; however, the reference frequency generator of $f_1$ to $f_8$ and the controller section become complicated, resulting in an increase in costs. Therefore, the number of track groups may be properly set in consideration of the cost performance.

In addition, although the quartz controlled oscillator was used as an oscillator in the embodiment, a VCO (Voltage Controlled Oscillator) may be used and an input electric power to the VCO may be changed in a stepwise manner and thereby to select the frequency.

As described above, by providing the track groups in the direction of radius of the disk, the clock rate can be easily changed while increasing the recording density.

Figure 11:
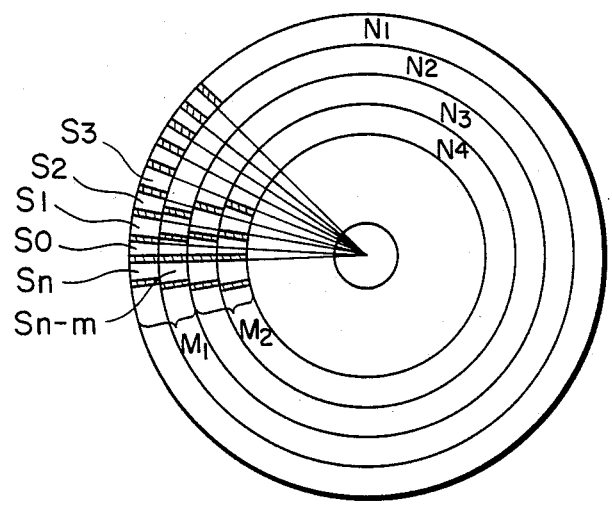
FIG. 11 is a diagram showing an example of formats on the disk in the invention.

Although the clock rates of the header portions were set to be constant in the embodiment, the capacity can be further increased due to a format shown in FIG. 11.

FIG. 11 shows an example of track and sector formats on the disk. $N_1$, $N_2$, $N_3$, and $N_4$ indicate track groups in the data recording section. In each track group, the recording is performed at the same recording frequency in the data recording sections $S_1$ to $S_n$ of each sector. Therefore, in the case of the reproduction as well, the sampling is performed by the reproduction clock due to the recording frequency and the recording data is reproduced.

For example, in the $N_1$ track group in the outermost portion of the disk, the recording is carried out in the data portion at the frequency $f_1$ (clock rate). Similarly, the data is recorded at the frequency $f_2$ in the $N_2$ track group inside the $N_1$; at the frequency $f_3$ in the $N_3$ track group; and at the frequency $f_4$ in the innermost $N_4$ track group, respectively. There is the realtion of $f_1 > f_2 > f_3 > f_4$ among those frequencies (clock rates). As described before, the recording density on the disk surface can be substantially optimized. $M_1$ and $M_2$ represent track groups of the header portions. The header portions at the heads of the respective sectors shown by the hatched portions on the disks surface of FIG. 11 are divided into the track groups $M_1$ and $M_2$ in the direction of radius on the disk surface as shown in the diagram. The recording frequency of the header portions in each track group is fixed. Assuming that the clock rates of the track groups $M_1$ and $M_2$ of the header portions are $f_5$ and $f_6$, respectively, there is the relation of $f_5 > f_6$. The address signals, sector numbers, and the like are preformated and recorded in the header portions. This recording disk rotates at the CAV mentioned before. The clock rate $f_6$ is determined by the innermost track in the $M_2$ track group of the header portions due to limitation of the beam diameter of the recording/reproducing light beam. The clock rate $f_6$ becomes the clock rate $f_4$ which is almost the same as that of the innermost track group $N_4$ of the data recording portion; namely, $f_6 \approx f_4$. Similarly, the clock rate $f_5$ of the track group $M_1$ of the header portions is nearly equal to $f_2$ since the innermost rim of the track group $M_1$ coincides with the innermost rim of the track group $N_2$ of the data recording portion; namely, $f_5 \approx f_2$.

As shown in FIG. 11, the track group $N_1$ of the outermost data recording portion is constituted by the sectors $S_0, S_1, \ldots, S_n$ and is formated such that $(n+1)$ sectors are formed for every track. Similarly, the $N_2$ track group consists of the sectors $S_0, S_1, \ldots S_{n-m}$ and is formated at the ratio of $(n-m+1)$ sectors/track, in which n and m are positive integers. The $N_3$ and $N_4$ track groups are similarly constituted and the number of sectors of the innermost track group $N_4$ is about $\frac{1}{2}$ of the number $(n+1)$ of sectors of the outermost track group $N_1$. Namely, the number of sectors of one track of each track group is nearly proportional to the radium of the innermost track of each track group. This is because when the recording range of the disk lies within the range of $\frac{1}{2}$ to 2/2 of the radius, the recording/reproducing performance of the disk is optimized.

For example, when considering the disk of a diameter of 200 mm, the radium is 100 mm, so that the outermost recording track may be set to a position near 94 mm and the innermost recording track may be set at a position near 54 mm. In this case, the track groups are divided such that: 94−84 mm for $N_1$; 84−74 mm for $N_2$; 74−64 mm for $N_3$; and 64−54 mm for $N_4$. Likewise, the track portions of the header portions are set such that 94−74 mm for $M_1$ and 74−54 mm for $M_2$, Since the pits which are formed in the innermost track in each track group are the severest in terms of the spatial frequency, the format is determined in accordance with the innermost track. For example, when data is recorded by assuming that the minimum recording pit length is 1.27 μm in the direction of track, one sector consists of 1010 bytes, and the recording modulation system is the MFM system, the track length with respect to the innermost track of the $N_4$ track group becomes as follows.

$$\text{Track length} = 2\pi \times 54 \text{ mm} = 339292 \ \mu\text{m} \qquad (1)$$

The length necessary to record one byte becomes $$1.27 \ \mu\text{m} \times 8 = 10.16 \ \mu\text{m} \qquad (2)$$

Therefore, the length of sector becomes $$10.16 \times 1010 = 10.26 \text{ mm} \qquad (3)$$

Thus, by dividing (1) by (3), the number of sectors per one track is obtained.

$$339292 \ \mu\text{m}/10.26 \text{ mm} = 33 \text{ sectors/track}$$

Therefore, the $N_4$ track group is constituted at the ratio of 33 sectors/track.

Similarly, the $N_3$ track group is consitituted at the ratio of $$2\pi \times 64 \text{ mm}/10.26 \text{ mm} = 39 \text{ sectors/track}$$

However, the $f_4$ frequency which is fundamentally the same as that of the $N_4$ track group is used as the recording clock rate in the track group $M_2$ of the header portion of the $N_3$ track group, so that the ratio of the area which is occupied by the header portion of one sector increases as the recording position approaches the outer periphery. Thus, the area which is occupied by the sectors which can be actually used for recording decreases. Therefore, the sector length including the header portion must be corrected so as to be increased by an amount as much as the header portions. The area of the sectors is reduced by an amount of about one sector as the result of this correction and the actual ratio becomes 38 sectors/track. Consequently, the $N_3$ track group is constituted at the ratio of 38 sectors/track.

Similarly, in the $N_2$ track group, since the recording clock rates in the header portions and data recording portions are $f_2$, the $N_2$ track group is constituted at the ratio of $$2\pi \times 74 \text{ mm}/10.26 \text{ mm} = 45 \text{ sectors/track}$$

Likewise, although the ratio in the $N_1$ track group becomes $$2\pi \times 84 \text{ mm}/10.26 \text{ mm} = 51 \text{ sectors/track}$$

the $N_1$ track group is constituted at the ratio of $$2\pi \times 84 \text{ mm}/10.26 \text{ mm} = 51 \text{ sectors/track}$$

as the result of the correction.

The above description will be summarized as in Table 1.

TABLE 1

| Track group | The number of sectors | Clock rate of the header portion | Clock rate of the data recording portion |
|---|---|---|---|
| $N_1$ | 50 | $f_2$ | $f_1$ |
| $N_2$ | 45 | $f_2$ | $f_2$ |
| $N_3$ | 38 | $f_4$ | $f_3$ |
| $N_4$ | 33 | $f_4$ | $f_4$ |

On one hand, since 10 mm/1.6 μm = 6250 tracks are formed in the area of 10 mm of each track group assuming that the pitch between tracks is 1.6 μm, the number of whole sectors is obtained by the following expression from the number of sectors which are included in each of the track groups $N_1$ to $N_4$.

$$(33+38+45+50) \times 6{,}250 = 1{,}037{,}500 \text{ sectors/surface}$$

Assuming that the number of user's bytes of one sector is 512 (hereinafter, "bytes" is referred to as B), the number of user's bytes per one surface becomes about 531 MB/surface (MB=10⁶ B).

In the above calculations, the fraction which is produced in the step of calculating the number of sectors of one track is omitted to obtain the sectors of an integer. It is sufficient to allocate the remainder to the gap between sectors and the like. In addition, among 1010 B sector, the number of bytes which can be used by the user for recording was set to 512 B and a part of the remaining bytes are used for the header portions and the other are used for a strong error correction; however, their detailed descriptions are omitted.

On ther other hand, in the case where the recording is performed on the whole surface at the clock rate $f_4$ on the basis of the format of the $N_4$ track group, namely, when the recording is executed on the whole surface by way of the CAV recording system, the recording capacity of the whole surface becomes $$(33+33+33+33)\times 6{,}250 = 825{,}000 \text{ sectors.}$$

Thus, the number of user's bytes per one surface becomes $$512 \text{ B} \times 825{,}000 = 422 \text{ MB/surface}$$

Therefore, according to the recording system of the embodiment, the recording capacity can be increased by $531/422 = 1.26$ times, namely, 26% as compared with that by the CAV system.

Figure 12:
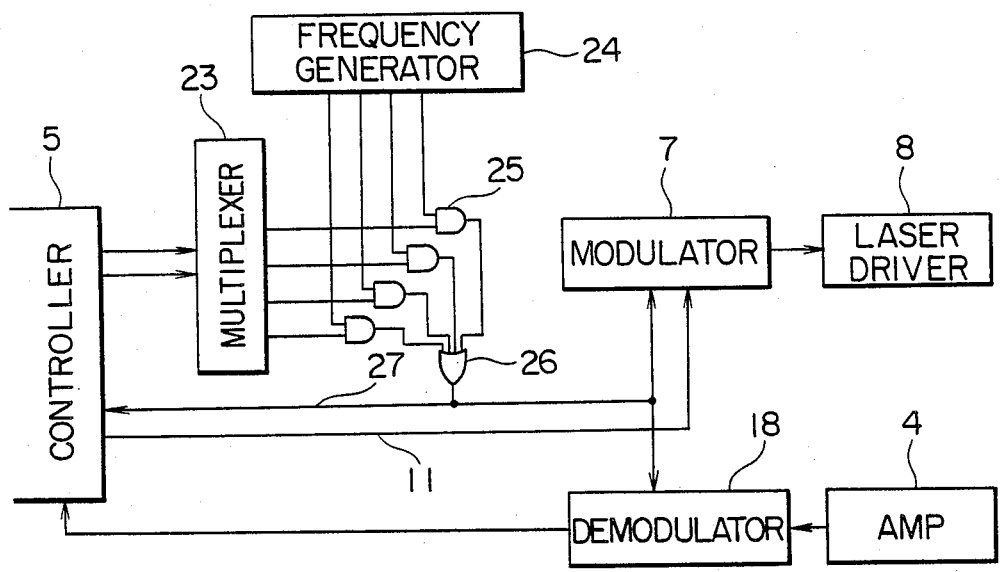
FIG. 12 is a block diagram showing an arrangement of the recording system.

The recording sequence of the disk of FIG. 11 will then be described hereinbelow with reference to FIG. 12. A two-bit encoding signal is first generated from the controllre 5 in the recording mode on the basis of the address number instructed by an external apparatus (not shown), namely, in dependence on to which one of the $M_1$ track group (i.e., $N_1$ and $N_2$ track groups) and the $M_2$ track group (i.e., $N_3$ and $N_4$ track groups) the header portions of this address belong. This 2-bit encoding signal is inputted to the multiplexer 23. The multiplexer 23 selects one of the AND gates 25 in accordance with the 2-bit signals 00, 01, 10, and 11. The frequency generator 24 generates the signals of the frequencies $f_1 f_2$, $f_3$, and $f_4$ and includes therein, for example, four oscillators using well-known quartz resonators. One of the frequencies $f_1$ to $f_4$ is selected by the selected AND gate 25. The outputs of the AND gates 25 are inputted to the OR gate 26. The output ($f_2$ or $f_4$) of the OR gate 26 becomes the reference clock 27 to read out the preformated address data of the header portions. This reference clock is inputted to the demodulator 18 and is used to analyze (demodulate) the access data of the header portions from the pre-amplifier 4 to amplify the signal read out from the disk. The demodulated data of the header portions is inputted to the controller 5. When this data coincides with the address instructed from the external apparatus, the 2-bit signal to select the frequency to record the data is outputted from the controller 5 to the multiplexer 23. One of the frequencies $f_1$ to $f_4$ corresponding to the track groups $N_1$ to $N_4$ where the recording is performed is selected in a manner similar to the above. The clock of the selected frequency becomes the reference clock 27 for recording and is sent to the controller 5. This clock is used to read out the recording data 11 and is also inputted to the modulator 7. The recording data 11 from the controller 5 and the recording reference clock 27 are inputted to the modulator 7, by which they are mixed and modulated. This modulated signal is outputted to the laser driver 8 and the data is recorded by the modulated light beam.

The reproducing system is substantially the same as that shown in FIG. 9; therefore, its description is omitted.

Figure 13B:
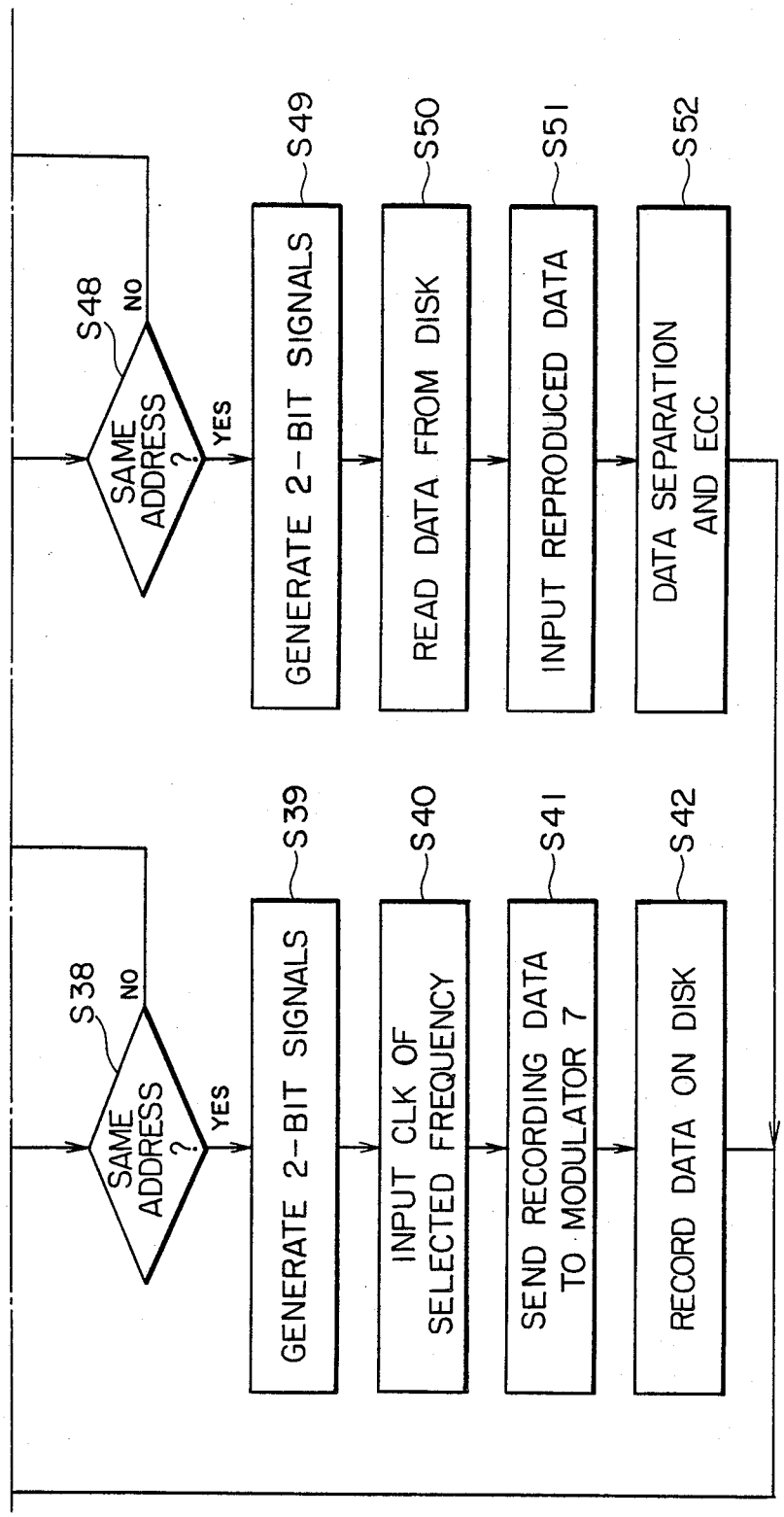

FIG. 13 shows a control flow of the controller in the embodiment. First, a check is made to see if the data recording or reproducing mode has been instructed from an external apparatus (not shown) (step S31). In the case of the data recording mode, the recording address and data are inputted from the external apparatus (steps S32 and S33).

Then, a check is made to see if the header portions of the inputted address information are included in the track group $M_1$ or $M_2$ (step S34). A 2-bit signal to select the frequency corresponding to each track group is outputted (steps S35 and S36).

The demodulated address information is inputted and a check is made to see if it is equal to the designated address or not (steps S37 and S38).

If they coincide, it is determined to which one of the track groups $N_1$ to $N_4$ the data belongs in accordance with the address information inputted and a 2-bit signal to select the recording frequency is transmitted to the multiplexer 23 (step S39). The clock of the selected frequency is inputted (step S40) and the recording data is transmitted to the modulator 7 synchronously with this clock (step S41). The motors and the like are controlled and the recording data is recorded on the disk in accordance with the modulated data (step S42). To reproduce the data, the reproduction address is inputted from the external apparatus (step S43). Either the frequency $f_2$ or $f_4$ is selected in dependence on to which one of the track groups $M_1$ and $M_2$ the header portions belong in a manner similar to the case in the recording mode (steps S44 to S46). A check is then made to see if the demodulated address information is equal to the designated address or not (steps S47 and S48). If they coincide, the 2-bit signal to select the recording frequency is sent to the multiplexer 23 (step S49). The motor and the like are controlled and the data is read out from the disk (step S50). The reproduced data demodulated by the clock of the selected frequency is inputted (step S51). The reproduction clock and reproduced data are separated and an error correcting process is performed by way of the error correcting code (ECC) to correct the errors and then the original data is reproduced (step S52).

Although the recording track groups are divided into four groups $N_1$ to $N_4$ in the embodiments, they may be divided into a slightly larger number of, e.g., eight groups $N_1$ to $N_8$. Therefore, the recording frequency may be finely divided into eight kinds of frequencies $f_1$ to $f_8$. In this case, the header portions may be finely divided into, e.g., $M_1$ to $M_4$ in correspondence to the recording track groups $N_1$ to $N_8$ instead of two groups $M_1$ and $M_2$. The clock rates of the header portions may correspond to $f_2$, $f_4$, $f_6$, and $f_8$, or $f_1$ to $f_8$.

Due to this, the whole recording capaciity increases; however, the reference frequency generator for generating the frequencies $f_1$ to $f_8$ and the controller section become complicated, resulting in an increase in cost. Therefore, proper track groups may be selected in consideration of the cost performance.

In addition, although the quartz controlled oscillator was used for the oscillator in the embodiment, a VCO (Voltage Controlled Oscillator) may be used and the frequency may be selected by changing an input electric power to the VCO in a stepwise manner.

As described above, by providing the track groups in the header portions and data recording portions with respect to the direction of radius of the disk, the clock rate can be easily changed while increasing the recording density.

The present invention is not limited to the foregoing embodiments but many modifications and variations are possible within the spirit and scope of the appended claims of the invention.

What is claimed is:

1. An apparatus for recording/reproducing information comprising:
    recording/reproducing means for at least one of recording information on and reproducing information from a rotary recording medium rotated at a predetermined constant angular velocity, wherein the recording medium comprises a plurality of information recording tracks each comprising at least one sector, the sector comprising a sector identification area for identifying the sector and a data area;
    generating means for generating a sync signal for recording information to the recording medium or for reading information from the recording medium; and
    control means for controlling a frequency of said sync signal in response to the designation of a track address at which information should be recorded or a track address from which information should be reproduced;
    wherein said control means maintains the frequency of said sync signal for data of the sector identification area constant regardless of the designated track address and forces a frequency of said sync signal for data of the data area to be changed in response to a change in the designated track address.

2. An apparatus for recording/reproducing information according to claim 1, wherein said control means further controls said frequency of said sync signal for data of the data area such that said frequency of said sync signal for data of the data area is increased in response to advancing of the designated track at which information should be recorded or from which information should be reproduced from an inner track to an outer track.

3. An apparatus for recording/reproducing information according to claim 2, wherein said control means continuously changes said frequency of said sync signal for data of the data area in response to a change in the designated track address.

4. An apparatus according to claim 2, wherein said control means further changes said frequency of sync signal for data of the data area for a plurality of adjacent tracks.

5. An apparatus according to claim 4, wherein said control means keeps constant said frequency of sync signal for data of the data area within a plurality of adjacent tracks.

6. An apparatus according to claim 2, wherein said control means causes said frequency of said sync signal for data of the sector identification area to coincide with a frequency of said sync signal for data of the most inner track in the data area.

7. An information recording/reproducing apparatus according to claim 1, wherein information indicating position and type of sector is recorded at said sector identification area.

8. An apparatus for recording/reproducing information according to claim 1, wherein said control means obtains a distance between a track address and a rotating center of the recording medium on the basis of the track address, and further controls said frequency of said sync signal for data of the data area in response to said obtained distance.

9. An apparatus according to claim 1, wherein said recording/reproducing means decodes the data of the sector identification area and the data of the data area with a common decoding system.

10. An apparatus according to claim 1, wherein said recording medium includes an optical disk.

11. An apparatus for recording/reproducing information comprising:
    recording/reproducing means for at least one of recording information on and reproducing information from a rotary recording medium rotated at a predetermined constant angular velocity, wherein the recording medium comprises a plurality of information recording tracks each comprising at least one sector, the sector comprising a sector identification area for identifying the sector and a data area;
    generating means for generating a sync signal for recording information to the recording medium or for reading information from the recording medium; and
    control means for controlling a frequency of said sync signal in response to the designation of a track address at which information should be recorded or a track address from which information should be reproduced;
    wherein said control means maintains the frequency of said sync signal for data of the sector identification area constant regardless of the designated track address and forces the frequency of said sync signal for data of the data area to be changed for each of said plurality of tracks in response to a change in the designated track address.

12. An apparatus according to claim 11, wherein said control means makes the frequency of said sync signal for data of the data area constant between a first predetermined track and a second predetermined track.

13. An apparatus according to claim 11, wherein the sector identification area includes information indicative of a track address.

14. An apparatus according to claim 11, wherein said control means controls said frequency of said sync signal for data of the data area such that said frequency of said sync signal for data of the data area is increased in response to the advancing of the designated track at which information should be recorded or from which information should be reproduced from an inner track to an outer track.

15. An apparatus according to claim 11, wherein said recording/reproducing means decodes the data of the sector identification area and the data of the data area with a common decoding system.

16. An apparatus according to claim 11, wherein said recording medium includes an optical disk.

17. An apparatus for recording/reproducing information comprising:
    recording/reproducing means for at least one of recording information on and reproducing information from a rotary recording medium rotated at a predetermined constant angular velocity, wherein the recording medium comprises a plurality of information recording tracks each comprising at least one sector, the sector comprising a sector identification area for identifying the sector and a data area;

generating means for generating a sync signal for recording information to the recording medium or for reading information from the recording medium; and control means for controlling a frequency of said sync signal in response to the designation of a track address at which information should be recorded or a track address from which information should be reproduced;

wherein said control means forces said frequency of said sync signal for data of the data area to be changed in response to a change in the designated track address to one of a plurality of types of frequencies and forces said frequency of said sync signal for data of the sector identification area to be changed in response to a change in the designated track address to one of a plurality of types of frequencies, and wherein said plurality of types of frequencies of said sync signal for data of the sector identification area is smaller than said plurality of types of frequencies of said sync signal for data of the data area.

18. An apparatus for recording/reproducing information according to claim 17, wherein said control means controls said frequency of said sync signal for data of said sector identification area such that said frequency of said sync signal for data of the sector identification area is increased in response to the advancing of the designated track at which information should be recorded or from which information should be reproduced from an inner track to an outer track.

19. An apparatus for recording/reproducing information according to claim 18, wherein said control means changes said frequency of sync signal for data of the sector identification area for a plurality of adjacent tracks.

20. An apparatus for recording/reproducing information according to claim 19, wherein said control means maintains constant said frequency of sync signal for data of the sector identification area within a plurality of adjacent tracks.

21. An apparatus for recording/reproducing information according to claim 17, wherein said control means controls said frequency of said sync signal for data of the data area such that said frequency of said sync signal for data of the data area is increased in response to the advancing of the designated track at which information should be recorded or from which information should be reproduced from an inner track to an outer track.

22. An apparatus for recording/reproducing information according to claim 21, wherein said control means changes said frequency of sync signal for data of the data area for a plurality of adjacent tracks.

23. An apparatus for recording/reproducing information according to claim 22, wherein said control means maintains constant said frequency of sync signal for data of the data area within a plurality of adjacent tracks.

24. An apparatus for recording/reproducing information according to claim 17, wherein said recording/reproducing means decodes the data of the sector identification area and the data of the data area with a common decoding system.

25. An apparatus according to claim 17, wherein said recording medium includes an optical disk.

* * * * *

UNITED STATES PATENT AND TRADEMARK OFFICE
CERTIFICATE OF CORRECTION

PATENT NO. : 4,918,677

DATED : April 17, 1990

INVENTOR(S) : Takaaki Ashinuma et al.

It is certified that error appears in the above-identified patent and that said Letters Patent is hereby corrected as shown below:

IN THE DRAWING SHEETS

FIGURE 3:

"GENERATER" should read --GENERATOR--.

FIGURE 13A:

In block 545, "REQUENCY f2" should read --FREQUENCY f2-- and,
    In block 546, "REQUENCY f4" should read --FREQUENCY f4--.

COLUMN 1:

Line 14, "apparatuses," should read --apparatus,--.

Line 44, "(constant" should read --(Constant--.

COLUMN 2:

Line 47, "$h_2$, the" should read --$h_2$, namely, the--.

Line 52, "performated" should read --preformatted--.

UNITED STATES PATENT AND TRADEMARK OFFICE
CERTIFICATE OF CORRECTION

PATENT NO. : 4,918,677

DATED : April 17, 1990

INVENTOR(S) : Takaaki Ashinuma et al.

It is certified that error appears in the above-identified patent and that said Letters Patent is hereby corrected as shown below:

COLUMN 3:

Line 67, "pll circuit" should read --PLL circuit--.

COLUMN 4:

Line 32, "generates" should read --generate--.

COLUMN 5:

Line 1, "preformated" should read --preformatted--.

Line 13, "formated" should read --formatted--.

Line 15, "formated" should read --formatted--.

COLUMN 6:

Line 5, "constituded" should read --constituted--.

Line 33, "calculting" should read --calculating--.

Line 49, "(33+X+33+33)X6250=825,000 sectors" should read --(33+33+33+33)X6250=825,000 sectors--.

UNITED STATES PATENT AND TRADEMARK OFFICE
CERTIFICATE OF CORRECTION

PATENT NO. : 4,918,677

DATED : April 17, 1990

INVENTOR(S) : Takaaki Ashinuma et al.

It is certified that error appears in the above-identified patent and that said Letters Patent is hereby corrected as shown below:

COLUMN 7:

Line 50, "preformated" should read --preformatted--.
Line 51, "preformated" should read --preformatted--.

COLUMN 8:

Line 33, "it" should read --they--

COLUMN 9:

Line 15, "mated" should read --matted--.

Line 30, "formated" should read --formatted--.

Line 33, "formated" should read --formatted--.

Line 39, "radium" should read --radius--.

Line 52, "$M_2$," should read --$M_2$.--.

COLUMN 11:

Line 34, "controllre 5" should read --controller 5--.

Line 50, "mated" should read --matted--.

UNITED STATES PATENT AND TRADEMARK OFFICE
CERTIFICATE OF CORRECTION

PATENT NO. : 4,918,677

DATED : April 17, 1990

INVENTOR(S) : Takaaki Ashinuma et al.

It is certified that error appears in the above-identified patent and that said Letters Patent is hereby corrected as shown below:

COLUMN 12:

Line 51, "embodiments," should read --embodiment,--.

Signed and Sealed this

Fourteenth Day of July, 1992

Attest:

DOUGLAS B. COMER

*Attesting Officer*     Acting Commissioner of Patents and Trademarks